United States Patent
Lee et al.

(10) Patent No.: US 9,406,946 B2
(45) Date of Patent: Aug. 2, 2016

(54) MEMBRANE-ELECTRODE ASSEMBLY, DIRECT CARBON FUEL CELL INCLUDING THE SAME, AND METHOD OF PREPARING THE SAME

(71) Applicant: GWANGJU INSTITUTE OF SCIENCE AND TECHNOLOGY, Gwangju (KR)

(72) Inventors: Jaeyoung Lee, Gwangju (KR); Hyung Kuk Ju, Gwangju (KR); Ji Young Eom, Gwangju (KR); Jae Kwang Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 368 days.

(21) Appl. No.: 14/143,406

(22) Filed: Dec. 30, 2013

(65) Prior Publication Data

US 2014/0356754 A1    Dec. 4, 2014

(30) Foreign Application Priority Data

May 29, 2013 (KR) .................. 10-2013-0061266

(51) Int. Cl.
  *H01M 8/02* (2016.01)
  *H01M 8/10* (2016.01)
  *H01M 8/12* (2016.01)

(52) U.S. Cl.
  CPC .......... *H01M 8/0232* (2013.01); *H01M 8/0256* (2013.01); *H01M 8/0282* (2013.01); *H01M 8/1213* (2013.01); *H01M 8/1233* (2013.01); *H01M 8/0252* (2013.01); *Y02E 60/521* (2013.01); *Y02E 60/525* (2013.01); *Y02P 70/56* (2015.11)

(58) Field of Classification Search
  CPC ............ H01M 8/0232; H01M 8/0252; H01M 8/0256; H01M 8/0282; H01M 8/1213; H01M 8/1233; Y02E 60/521; Y02E 60/525; Y02P 70/56
  See application file for complete search history.

(56) References Cited

FOREIGN PATENT DOCUMENTS

KR    10-2010-0100507 A    9/2010
KR    101124217 B1    3/2012

OTHER PUBLICATIONS

P. Desclaux et al., Investigation of direct carbon conversion at the surface of a YSZ electrolyte in a SOFC, (International Journal of Hydrogen Energy 36 (2011) p. 10278-10281).

Chen Li et al., Effect of contact type between anode and carbonaceous fuels on direct carbon fuel cell reaction characteristics, (Journal of Power Sources 196 (2011) p. 4588-4593).

*Primary Examiner* — Brittany Raymond
(74) *Attorney, Agent, or Firm* — Hauptman Ham, LLP

(57) ABSTRACT

Disclosed herein is a direct carbon fuel cell in which a coal fuel is oxidized electrochemically so as to create electrons to cause the electrons to generate electricity by a voltage difference between two electrodes. Specifically, a membrane-electrode assembly for operating a low rank coal fuel, a direct carbon fuel cell including the same, and a method of preparing the same are provided.

6 Claims, 5 Drawing Sheets

MEMBRANE-ELECTRODE ASSEMBLY, DIRECT CARBON FUEL CELL INCLUDING THE SAME, AND METHOD OF PREPARING THE SAME

CROSS REFERENCE TO RELATED APPLICATION

This application claims priority to Korean Patent Application No. 10-2013-0061266 on 29 May 2013, and all the benefits accruing therefrom under 35 U.S.C. §119, the contents of which is incorporated by reference in its entirety.

BACKGROUND OF THE INVENTION

1. Technical Field

The present invention relates to a membrane-electrode assembly, a direct carbon fuel cell including the same, and a method of preparing the same.

2. Description of the Related Art

Carbon exists in the solid state in nature so that it has an advantage in that it has higher energy density than hydrogen existing in the gas state, for example. However, it is difficult to make reaction occur between solid carbon and a solid anode catalyst at a three-phase boundary (TPB) in contact with a porous catalyst. With reference to documents relating to a direct carbon fuel cell (DCFC) which uses coal as a fuel, the operating methods of a fuel cell may vary depending on its system configuration and the kinds of its electrolytes. These methods were contemplated in an effort to overcome lower reactivity at the anode electrochemical reaction interface in a fuel cell using coal as a fuel.

Methods have been proposed that make a coal as its gaseous phase or make use of an electrolyte to contact liquidus molten carbonates with carbon, such that the contact between a solid fuel and a solid anode may be improved. However, such methods compromise thermodynamic advantages that produce at least 80% efficiency in a direct electrochemical reaction. This is because chemical energy from carbon is not directly used electrochemically, but CO from a chemical reaction, e.g., Reverse Boudouard reaction: $C+CO_2 \rightarrow CO$, is used as a fuel, or steam or oxygen was introduced to facilitate an internal chemical reforming reaction when fueled for steam reforming or partial oxidation. A systematically crucial factor in DCFCs is reducing an ohmic resistance between a membrane-electrode assembly (MEA) and a current collector, and charging a solid carbon fuel therefor. This is because, at an anode, good contact between the solid carbon fuel and a catalytic reaction site of the anode allows electrochemical reaction to easily occur. To this end, however, current collecting methods used in a conventional solid oxide fuel cell (SOFC) may not be employed in the same way to a direct carbon fuel cell, because sufficient reaction sites may not be obtained in such case. Although many researches are now ongoing for a direct electrochemical oxidation of a solid carbon fuel in DCFC, but little achievement has been made so far to couple MEA with a current collector as well as to charge a fuel. Desclaux et al. discloses a direct carbon fuel cell having a structure as shown in FIGS. 1A and 1B, which includes a solid coal, a Pt mesh and a Pt wire disposed on a fuel-electrode(anode)/electrolyte/air-electrode(cathode) structure (International Journal Hydrogen Energy 36 (2011) 10278-10281). In this case, since the Pt wire is in contact only with the solid coal, but not with an adhesive, as well as not with the anode, the electron transfer resistance at the interface is high.

Chen Li et al. discloses a direct carbon fuel cell having a structure as shown in FIG. 2, which includes (Ag or Pt adhesive)/(Pt mesh+Pt wire)/(solid coal layer) disposed on a fuel-electrode(anode)/electrolyte/air-electrode(cathode) (Journal of Power Sources 196 (2011) 4588-4593). In this case, although the Pt wire is connected with the Pt mesh through a coal layer, and the Pt mesh is intimately connected with the anode by the Ag adhesive, since the coal fuel needs to be provided to the anode through the Pt mesh and Ag adhesive layer, the fuel transfer resistance at the interface is high.

RELATED ART DOCUMENT

Non-Patent Documents (Non-Patent Document 1) International Journal Hydrogen Energy 36 (2011) 10278-10281
(Non-Patent Document 2) Journal of Power Sources 196 (2011) 4588-4593

SUMMARY OF THE INVENTION

An object of the present invention is to provide a method for charging a solid carbon fuel which may minimize the electron transfer resistance and the fuel transfer resistance at the interface, and exemplary embodiments which may improve the resulting performance of a direct carbon fuel cell.

According to an exemplary embodiment of the present invention, there is provided a membrane-electrode assembly for a direct carbon fuel cell, including: (a) a cathode; (b) a electrolyte disposed above and adjacent to the cathode; (c) an anode disposed above and adjacent to the electrolyte; (d) a current collector disposed on the anode; (e) a coal fuel layer covering an upper surface and a lower surface of the current collector and charging the current collector; and (f) a wire connected with the current collector and protruded from the coal fuel layer covering the upper surface of the current collector.

According to another exemplary embodiment of the present invention, there is provided a method of preparing a membrane-electrode assembly for a direct carbon fuel cell, including: (A) connecting a wire with a current collector; (B) disposing the current collector connected with the wire on an anode of a fuel-electrode(anode)/electrolyte/air-electrode (cathode) structure; and (C) disposing a coal fuel layer on the current collector, wherein the coal fuel layer is permeated to the lower surface of the current collector through the current collector, such that the coal fuel layer is physically connected with the anode.

According to other exemplary embodiments of the present invention, there are provided a direct carbon fuel cell including the membrane-electrode assembly as described above, and a method of preparing the same.

DESCRIPTION OF THE EXEMPLARY EMBODIMENTS

Exemplary embodiments of the present invention will now be described in detail with reference to the accompanying drawings.

Figure 1A:
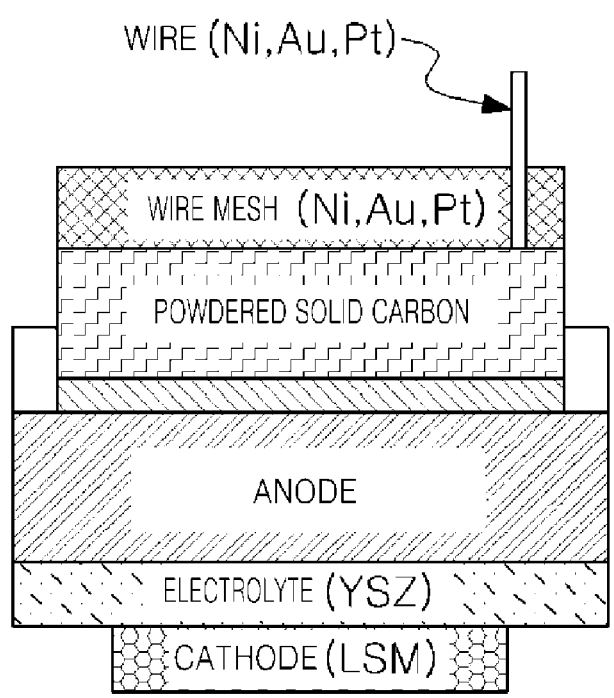
FIGS. 1A, 1B and 2 are schematic views which show a membrane-electrode assembly for a direct carbon fuel cell according to the related art.
Figure 1B:
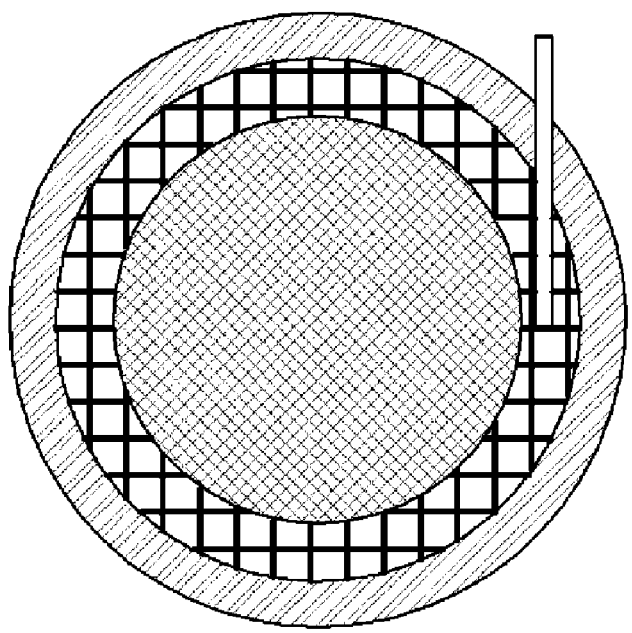
Figure 2:
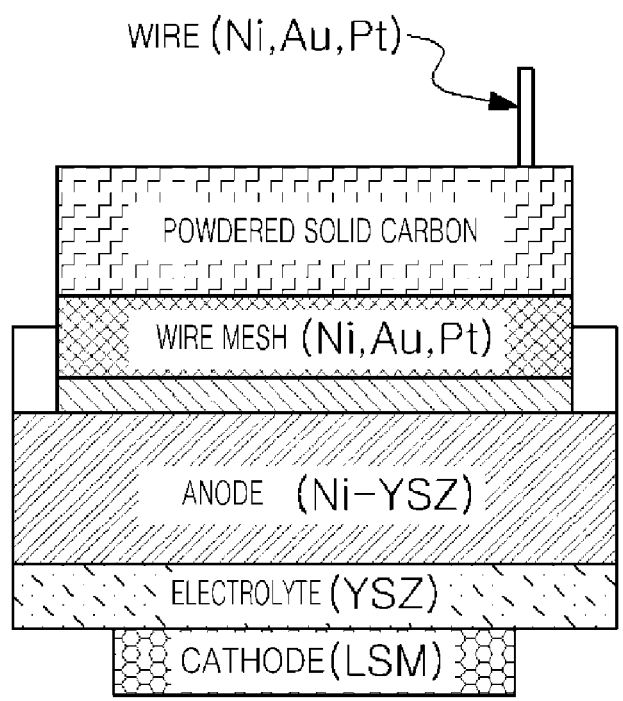
Figure 3A:
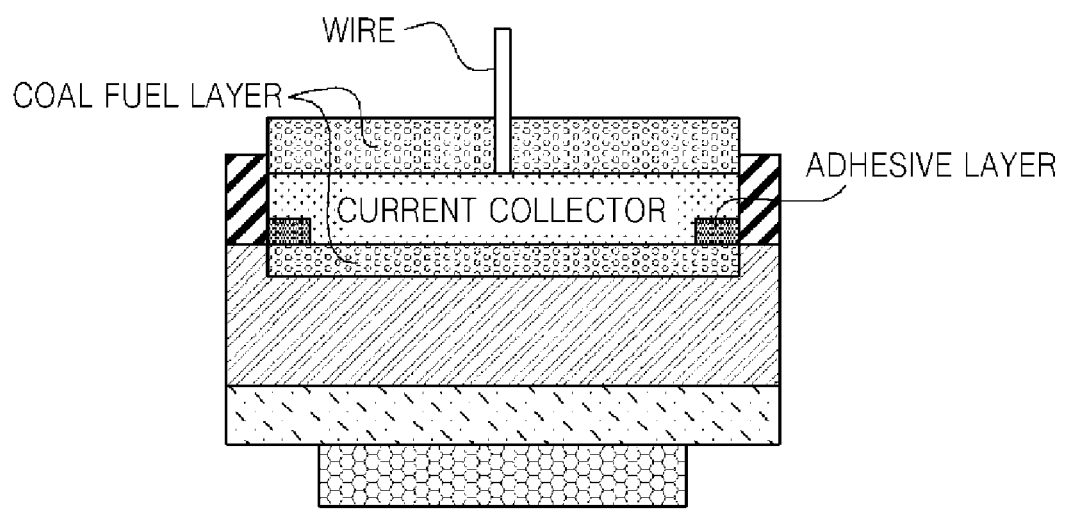
FIGS. 3A and 3B are schematic views which show a membrane-electrode assembly for a direct carbon fuel cell according to exemplary embodiments of the present invention.
Figure 3B:
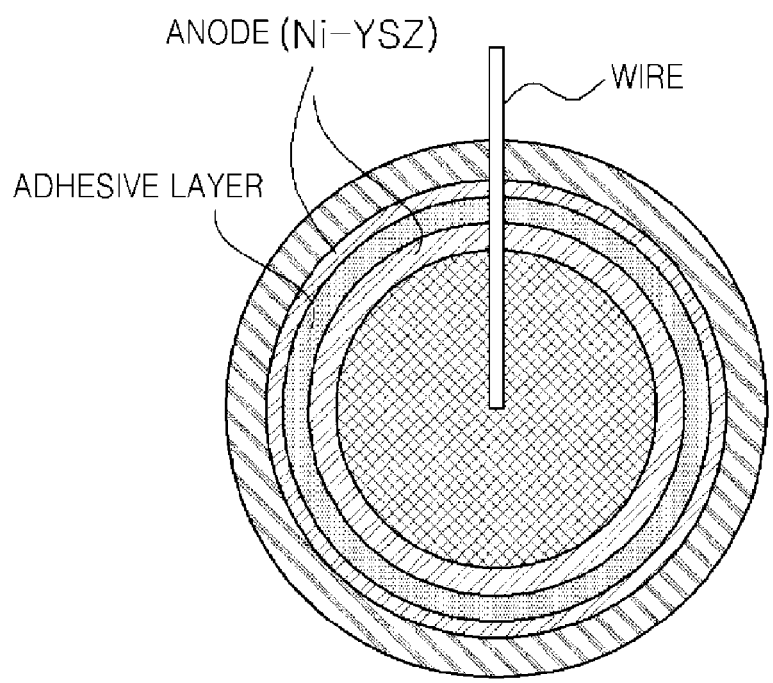

As shown in FIGS. 3A and 3B, a membrane-electrode assembly for a direct carbon fuel cell according to one aspect of the present invention includes: (a) a cathode; (b) an electrolyte above and adjacent to the cathode; (c) an anode disposed above and adjacent to the electrolyte; (d) a current collector disposed on the anode; (e) a coal fuel layer covering an upper surface and a lower surface of the current collector and charging the current collector; and (f) a wire connected with the current collector and protruded from the coal fuel layer covering the upper surface of the current collector.

According to one exemplary embodiment, the coal fuel layer may be of a gel type.

According to other exemplary embodiment, the coal fuel layer may be formed by placing the current collector on the anode, and placing a gel type coal fuel layer on the current collector, wherein the gel type coal fuel layer may permeate to the lower surface of the current collector through the current collector, such that the gel type coal fuel layer may be physically connected with the anode.

According to another exemplary embodiment, the direct carbon fuel cell further includes (g) an adhesive layer interposed between the anode and the current collector, wherein the adhesive layer may be formed only on the lower surface of the current collector, and the coal fuel layer may be provided between the lower surface of the mesh and the anode where no the adhesive layer is formed.

According to still another exemplary embodiment, the adhesive layer may be formed only at the periphery of the current collector, and the coal fuel layer may be present between the anode and the center of the lower surface of the mesh where the adhesive layer is not formed.

According to still yet another exemplary embodiment, the current collector may be a Pt mesh, and the wire may be a Pt wire. Further, the adhesive layer may be an Ag or Pt adhesive layer, and the gel type coal fuel layer may include 1.5 to 3.5 g of coal fuel based on 1 mL of ethylene glycol.

A further aspect of the present invention relates to a direct carbon fuel cell including a membrane-electrode assembly for a direct carbon fuel cell according to various exemplary embodiments of the present invention.

Still further aspect of the present invention pertains to a method of preparing a membrane-electrode assembly for a direct carbon fuel cell, including: (A) connecting a wire with a current collector; (B) disposing the current collector connected with the wire on an anode of an anode of a fuel-electrode(anode)/electrolyte/air-electrode(cathode) structure; and (C) disposing a coal fuel layer on the current collector, wherein the coal fuel layer is permeated to the lower surface of the current collector through the current collector, such that the coal fuel layer is physically connected with the anode.

According to one exemplary embodiment, the (C) of disposing a coal fuel layer on the current collector may be carried out by (C1) applying a gel type coal fuel layer, or (C2) applying a paste type coal fuel layer with a brush, or (C3) spraying a spraying liquid type coal fuel layer, on the current collector.

As such, we have found that when the fluidity of the coal fuel is enhanced by forming the coal fuel layer, such fluidity would be further enhanced by solvents, i.e., ethylene glycol, added during temperature rising to at least 700° C. at which a direct carbon fuel cell operates, and therefore results in a good permeation of a mesh type current collector as well as a better physical connection with a reaction site of the electrode having a pore structure.

Preferably, a gel type coal fuel layer may be applied on the current collector, and more preferably, the gel type coal fuel layer may be applied thereon in an amount of 1.5 g to 3.5 g based on 1 mL of ethylene glycol. Within this range, the gel type coal fuel layer may permeate the current collector and uniformly distributed on the upper and lower surfaces and the inside of the current collector, and therefore lead to performance improvement in the final fuel cell.

According to another exemplary embodiment, the (B) disposing may be carried out by forming an adhesive layer between the anode and the current collector to connect the anode with the current collector. The adhesive layer may be formed only on the lower surface of the current collector, and the coal fuel layer may exist between a lower surface of the mesh and the anode where no adhesive layer is formed.

According to a further exemplary embodiment, the adhesive layer may be formed only at the periphery of the current collector, and the coal fuel layer may exist between a central lower surface and the anode where no adhesive layer is formed. As such, when the adhesive layer is formed only at the periphery of the current collector, since the anode and the current collector are directly connected with each other, the interfacial resistance is low, and the blockage of the reaction site of the anode caused by the adhesive layer may be minimized, thereby the performance of the final fuel cell may be improved.

According to still yet another exemplary embodiment, the current collector may be a Pt mesh, and the wire may be a Pt wire. Further, the adhesive layer may be an Ag or Pt adhesive layer, and the gel type coal fuel layer may include 1.5 to 3.5 g of coal fuel based on 1 mL of ethylene glycol.

Another aspect of the present invention relates to a method of preparing a direct carbon fuel cell including a method of preparing a membrane-electrode assembly according to various exemplary embodiments of the present invention.

Hereinafter, some features and principles of various aspects and diverse exemplary embodiments of the present invention will now be described in more detail.

The present inventions are intended to develop a direct carbon fuel cell system using a button type cell, reduce an ohmic resistance generated when connecting the current collector with the electrode, and increase the connectivity between the solid coal fuel and the porous catalyst, and therefore improve the performance of the fuel cell.

In system configuration, a reactor is equipped with a compressive spring top and bottom thereof and a manual screw in upper and lower portions thereof. With the lower manual screw, a current collector rod of the cathode is forced to apply pressure to a catalyst portion of the cathode in the direct membrane-electrode assembly (MEA), such that the rod is directly and physically grounded to minimize the contact resistance. As the result, the use of heterogeneous materials such as a gold or silver adhesive in the cathode may be excluded.

Unlike the cathode, since the MEA portion of the anode should contain a solid carbon fuel, different methods are employed compared with that of the cathode. First, 1.2 cm×1.2 cm size of Pt mesh (52 meshes, 0.1 mm, 99.9%) and 5 cm length of Pt wire (0.5 mm, 99.99%) are connected using spot welding. In order to increase conductivity at elevated temperatures, the contact part of Pt mesh and Pt wire is further flame welded using Au (0.5 mm, 99.99%) at a temperature of at least 1,300° C. to produce a Pt current collector.

In bonding the thus produced Pt current collector and MEA anode catalyst, Ag paste is used which exhibits an excellent contact during high temperature operating of DCFC. Ag adhesive is applied only at the periphery of Pt current collector in the minimal amount of 0.2 mg to minimize the resistance at the interface of between Ag and Pt and to maximize the reaction site of the solid carbon.

Temporary sealing is made by a gasket (Thermiculite 866, USA), a kind of mica, allowing for impact absorption at both ends of MEA when coupled. A reactor including the anode and the cathode is sealed by adjusting the upper screw to control the pressure applied to the cathode and the whole MEA, at the time of completing the current collecting in the lower cathode and the upper anode. Since thermal expansion coefficients are different depending on the total thickness of MEA and the kinds of catalyst, a pressure may be optimally controlled by controlling the upper and lower screws through an empirical method.

In addition, the changes in the high frequency (1 kHz) ohmic resistance are observed using AC-impedance meter which may measure 1 kHz of AC impedance at a response rate of several seconds in temperature rising of DCFC, and, if necessary, the pressure may be further controlled by a tangent screw before operating DCFC.

Finally, a ceramic adhesive (Cerambond 668, Aremco, USA) is applied around the MEA and the reactor. This is because if oxygen is introduced into the anode by leakage to chemically oxidize the fuel, the amount of carbon involved in an electrochemical reaction will be reduced and the total efficiency of the fuel cell will be therefore lowered.

In order to prepare a fuel which facilitates an electrochemical reaction at the electrochemical reaction interface where the fuel and the anode catalyst are met, a raw material of coal is finely grounded, and only the coal particles of at most 300 μm are selected through 50 meshes sieve. The coal is mixed with ethylene glycol in a specific ratio to produce a gel with viscosity to increase the reaction efficiency between the solid coal fuel particles and the solid anode. The mixed fuel is loaded into the anode masked by Thermiculite in size 1 cm2 under specific pressure.

It would increase the physical contact between the fuel particles and the anode pores during the temperature rising of DCFC. Furthermore, when the MEA prepared for convenient charging of the solid carbon fuel is connected with the reactor, the body of the anode reactor may be moved in sliding door manner to cause the body to slide forward and backward.

<Reaction at Cathode>

$O_2/Air+4e^- \rightarrow 2O^{2-}$

<Reaction of Anode>

$C+2O^{2-} \rightarrow CO_2+4e^-$ $C+O^{2-} \rightarrow CO+2e^-$ $CO+O^{2-} \rightarrow CO_2+2e^-$ $C+CO_2 \leftrightarrow 2CO$ <Total Reaction>

$C+O_2 \rightarrow CO_2$

Now, embodiments of the present invention will be described in detail. The embodiments are merely illustrative and should not be construed as limiting the scope of the present invention. It is to be noted that the information contained in the invention of this specification is sufficient to enable those skilled in the art to easily practice the claimed invention even without specific experiment results.

EXAMPLE 0.5 g of coal and 0.2 mL of ethylene glycol were mixed to produce gel type fuel, and loaded into anode. Then, thus prepared cell was connected with Pt wire in the reactor body. Prior to temperature rising of DCFC, Ar gas was injected thereinto for at least 30 minutes for ventilation so as to remove any oxygen remaining in the reaction site of the anode, and then selectively discharge gas in a manner of downward substitution at the end of the vent of the anode. Temperature was elevated at 5° C./min through furnace. Constant flow rate of inert gas (Ar) was injected consecutively into the anode, and constant flow rate of air or oxygen was injected into the cathode. In the examples of the present invention, we operated the reactor at the interval of 50° C. in the temperature range of from 750° C. to 900° C., and conducted experimentation after stabilizing period of at least several minutes.

As set forth above, according to exemplary embodiments of the present invention, electron transfer resistance and fuel transfer resistance at the interface may be minimized, as well as the resulting performance of a direct carbon fuel cell may be improved.

In particular, a direct carbon fuel cell system may be developed using a button type cell, may lower the ohmic resistance generated when an electrode is coupled with a current collector, and may increase the connectivity between a solid coal fuel and a porous catalyst to thereby provide high performance.

What is claimed is:

1. A membrane-electrode assembly for a direct carbon fuel cell, comprising:
    (a) a cathode;
    (b) an electrolyte disposed above and adjacent to the cathode;
    (c) an anode disposed above and adjacent to the electrolyte;
    (d) a current collector disposed on the anode;
    (e) a coal fuel layer covering an upper surface and a lower surface of the current collector and filling the current collector; and
    (f) a wire connected with the current collector and protruding from the coal fuel layer covering the upper surface of the current collector.

2. The membrane-electrode assembly for a direct carbon fuel cell of claim 1, wherein the coal fuel layer is of a gel type.

3. The membrane-electrode assembly for a direct carbon fuel cell of claim 2, wherein the coal fuel layer is formed by placing the current collector on the anode, and placing the gel type coal fuel layer on the current collector, such that the gel type coal fuel layer permeates to the lower surface of the current collector through the current collector and thereby the gel type coal fuel layer is physically connected with the anode.

4. The membrane-electrode assembly for a direct carbon fuel cell of claim 3, further includes (g) an adhesive layer interposed between the anode and the current collector, wherein the adhesive layer is formed only on the lower surface of the current collector, and the coal fuel layer is provided between the lower surface of the mesh and the anode where no adhesive layer is formed.

5. The membrane-electrode assembly for a direct carbon fuel cell of claim 4, wherein the adhesive layer is formed only at the periphery of the current collector, and the coal fuel layer is provided between the anode and the center of the lower surface of the mesh where no adhesive layer is formed.

6. The membrane-electrode assembly for a direct carbon fuel cell of claim 5, wherein the current collector is a Pt mesh, the wire is a Pt wire, the adhesive layer is an Ag or Pt adhesive layer, and the gel type coal fuel layer includes 1.5 g to 3.5 g of coal fuel based on 1 mL of ethylene glycol.

* * * * *